(12) United States Patent
Beck et al.

(10) Patent No.: US 6,494,442 B2
(45) Date of Patent: Dec. 17, 2002

(54) SELF PUMPING HYDROPNEUMATIC SPRING STRUT WITH INTERNAL LEVELING

(75) Inventors: Hubert Beck, Eitorf (DE); Dieter Eulenbach, Eitorf (DE)

(73) Assignee: Mannesmann Sachs AG, Eitorf (DE)

( * ) Notice: Subject to any disclaimer, the term of this patent is extended or adjusted under 35 U.S.C. 154(b) by 0 days.

(21) Appl. No.: 09/732,969

(22) Filed: Dec. 8, 2000

(65) Prior Publication Data

US 2001/0005065 A1 Jun. 28, 2001

(30) Foreign Application Priority Data

Dec. 8, 1999 (DE) .......................................... 199 59 197

(51) Int. Cl.[7] .............................................. B60G 17/00
(52) U.S. Cl. .............................. 267/64.17; 267/DIG. 2; 267/64.16
(58) Field of Search .......................... 267/64.16, 64.17, 267/64.14, DIG. 1, DIG. 2; 188/313, 316; 280/5.515, 124.158

(56) References Cited

U.S. PATENT DOCUMENTS

| 3,884,040 A | * | 5/1975 | Green ......................... 188/353 |
| 4,577,840 A | * | 3/1986 | Meller et al. ............. 267/64.17 |
| 4,648,621 A | * | 3/1987 | Yokoya et al. ........... 267/64.17 |
| 4,993,693 A | * | 2/1991 | Lohr et al. ................ 267/64.17 |
| 5,551,540 A | * | 9/1996 | Forster et al. ............... 188/299 |
| 5,564,680 A | * | 10/1996 | Sano et al. ............... 267/64.17 |
| 5,941,508 A | * | 8/1999 | Murata et al. ........... 267/64.17 |
| 5,988,607 A | * | 11/1999 | Beck ........................ 267/64.26 |
| 6,202,993 B1 | * | 3/2001 | Wilms et al. ................ 267/136 |

* cited by examiner

*Primary Examiner*—Matthew C. Graham
*Assistant Examiner*—Mariano Sy
(74) *Attorney, Agent, or Firm*—Cohen, Pontani, Lieberman & Pavane

(57) ABSTRACT

A self-pumping hydropneumatic spring strut with internal leveling is provided for use in motor vehicles having an oil filled working cylinder, which is under the pressure of at least one gas cushion arranged in a high pressure chamber and acting as a spring. The high pressure chamber is connected to a working space, wherein a bleed opening forms a flow connection between the working space and the low pressure chamber. The bleed opening can be closed as a function of the position of the working piston in the working cylinder. The spring strut is assigned an actuator which displaces the spring strut in the vertical direction. The actuator can displace the motor vehicle to a plurality of displacement distances without requiring any electrical or electronic control, complex external leveling devices, or displacement detection systems.

6 Claims, 6 Drawing Sheets

SELF PUMPING HYDROPNEUMATIC SPRING STRUT WITH INTERNAL LEVELING

BACKGROUND OF THE INVENTION

1. Field of the Invention

The present invention relates to a self-pumping hydropneumatic spring strut with internal leveling. More particularly, the present invention relates to a spring strut having an actuator for elevating a motor vehicle to a variety of levels.

2. Description of the Related Art

German reference DE 198 18 116 C1 discloses self-pumping hydropneumatic spring struts with internal leveling having a piston pump that is driven by the suspension movements and pumps oil out of a low-pressure chamber into the working space connected to the high pressure chamber. Driven by this pump, the spring strut keeps the vehicle at a constant distance from the ground, depending on its state of loading. This is a mechanical subassembly, the basic level of which does not require any electrical or electronic control. However, it has been found in practice that rather than be at a constant distance from the ground at all times, certain applications require the vehicle body to be elevated at different levels.

The prior art also includes externally supplied leveling devices capable of moving the vehicle body to various heights and keeping it there resiliently, irrespective of the state of loading, through the use of hydraulics or compressed air. For example, a central level of the vehicle body could be used for local driving, while a lower level of the vehicle body might be advantageous for freeway driving for reasons of aerodynamics. A high level of the vehicle body relative to the ground might be advantageous in order to avoid contact between the body and the ground when driving off road.

Self-pumping leveling devices can manage only a single level. Externally supplied leveling devices are of very complex instruction. In particular, a pneumatic spring requires not only a correspondingly large amount of installation space but also a compressor, an air dryer and pressurized fluid lines extending throughout the vehicle. The situation is similar with hydropneumatic systems (spring cylinders) require the engine compartment accommodate pressurized fluid lines leading to the individual spring cylinders from an oil pump and oil reservoir.

Furthermore, displacement detection systems (height sensors) are required to allow different levels to be adopted. These are often difficult to accommodate in the vehicle since they have to be installed between the vehicle body and the axle of the running gear. If the vehicle is also supposed to compensate for skew loads, a sensor is required for each wheel, in which case the displacement signals have to be processed by a corresponding electronic system and a control circuit.

SUMMARY OF THE INVENTION

It is the object of the present invention to create a simple self-pumping hydropneumatic spring strut in which a leveling device with more than one level can be created by simple means.

To achieve this object, the present invention provides for the spring strut to be assigned an actuator which displaces the spring strut in the vertical direction.

Advantageously, the spring strut assumes a desired level by mechanical means, irrespective of the state of loading, without the need for an electrical or electronic control system. The additional actuator provided is then used to modify the basic level. Both the actuator and the spring strut operate independently of the state of loading of the vehicle.

According to an easy to produce embodiment of the present invention, the actuator is constructed as a separate component and is arranged between the spring strut and the body and running gear, respectively. Advantageously, a standard spring strut can be combined with an actuator constructed as a subassembly and can be installed in the vehicle as a complete assembly.

According to a further embodiment, a subassembly can be created by making the actuator an integral part of the spring strut.

Irrespective of whether the actuator is a separate component or integrated into the spring strut, another advantageous embodiment allows the actuator to be driven electrically, hydraulically or pneumatically.

A particularly advantageous embodiment provides for the actuator to have a self locking means. To this end, the actuator is made as a spindle drive, worm gear, or the like.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
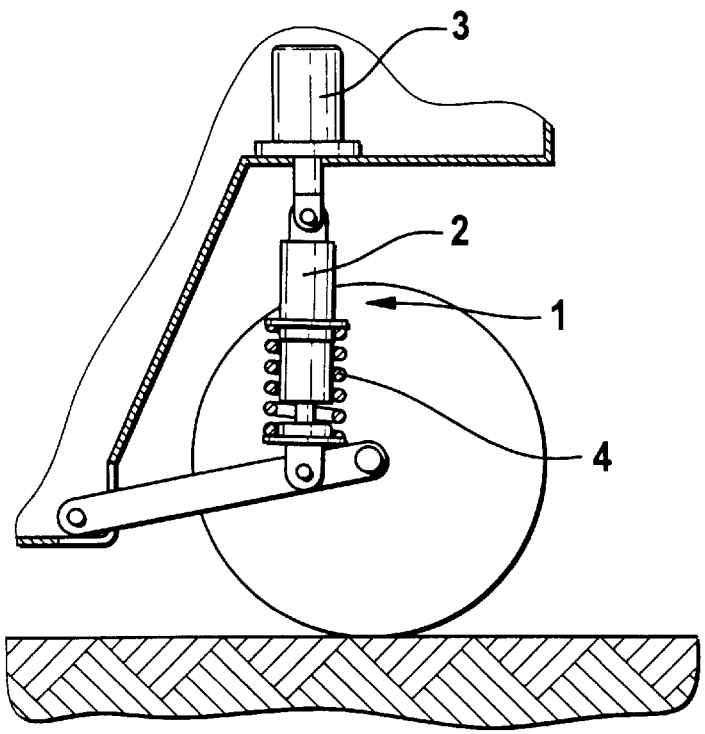
FIG. 1 shows the present invention mounted in a vehicle in a first position.

FIG. 1 illustrates a leveling device 1, which comprises a self-pumping hydropheumatic spring strut 2 and a separate actuator 3. In this embodiment, the spring strut 2 is of partially load bearing design, i.e., is provided with a support spring 4. If required, the self-pumping hydropneumatic spring strut 2 can also be fully load bearing, i.e., can be made without a mechanical support spring 4. If the vehicle is subjected to full load while stationary (as illustrated), the body is initially pressed down in accordance with the spring rate.

Figure 2:
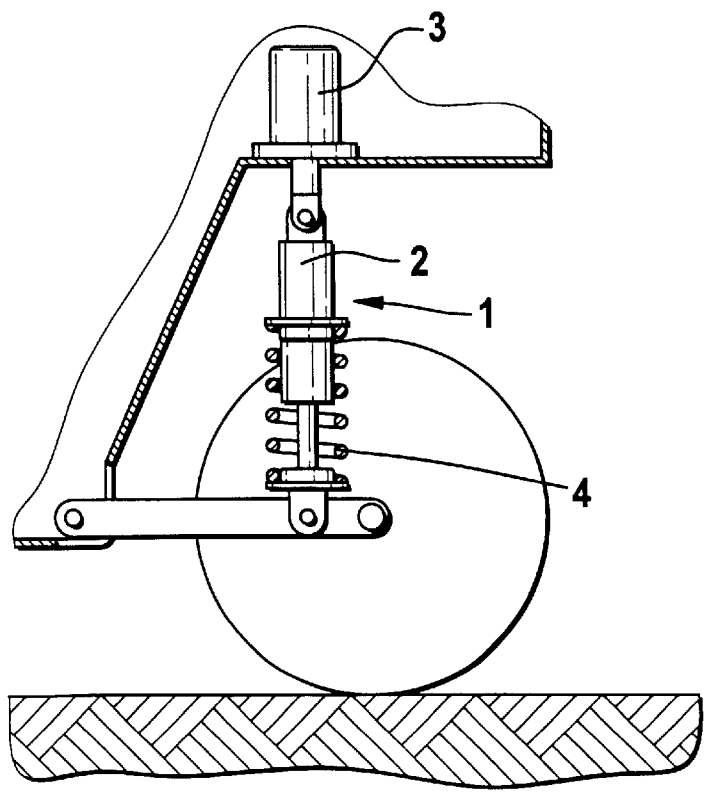
FIG. 2 shows the present invention mounted in a vehicle in a second position.

Referring now to FIG. 2, the leveling device 1 has been raised to the basic level. This occurs after a certain distance traveled since, as know per se, the self-pumping hydropneumatic spring strut 2 is leveled by the excitation provided by the roadway. The actuator 3 remains in the same position, as apparent from FIG. 1. This basic level illustrated in FIG. 2 is retained in local traffic, for example, and is independent of load.

Figure 3:
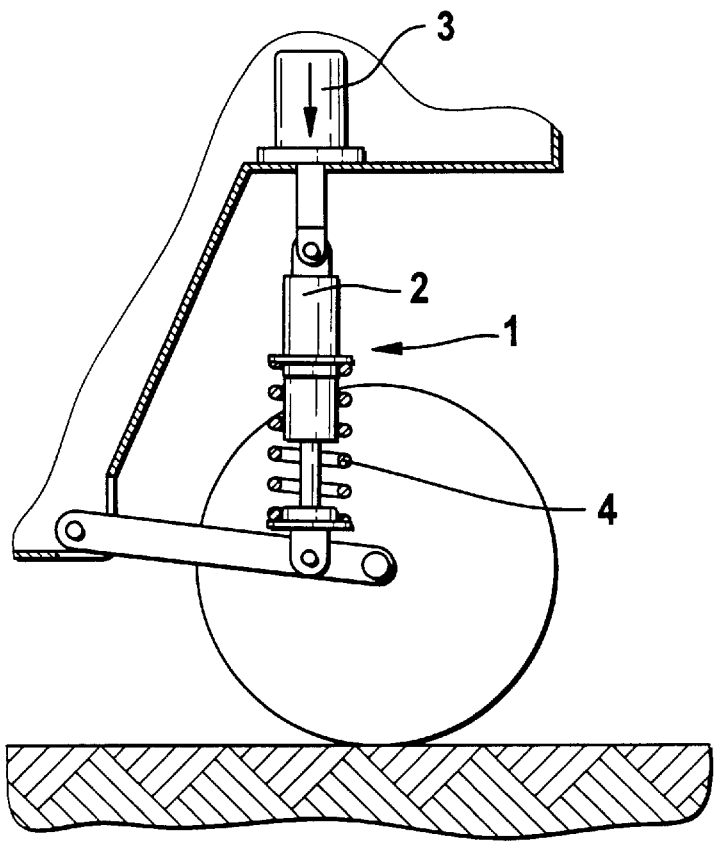
FIG. 3 shows the present invention mounted in a vehicle in a third position.

FIG. 3 shows the leveling device 1 illustrated in FIG. 1 in all terrain mode. To avoid contact between the body and the ground, the level is raised by means of the actuator 3.

Figure 4:
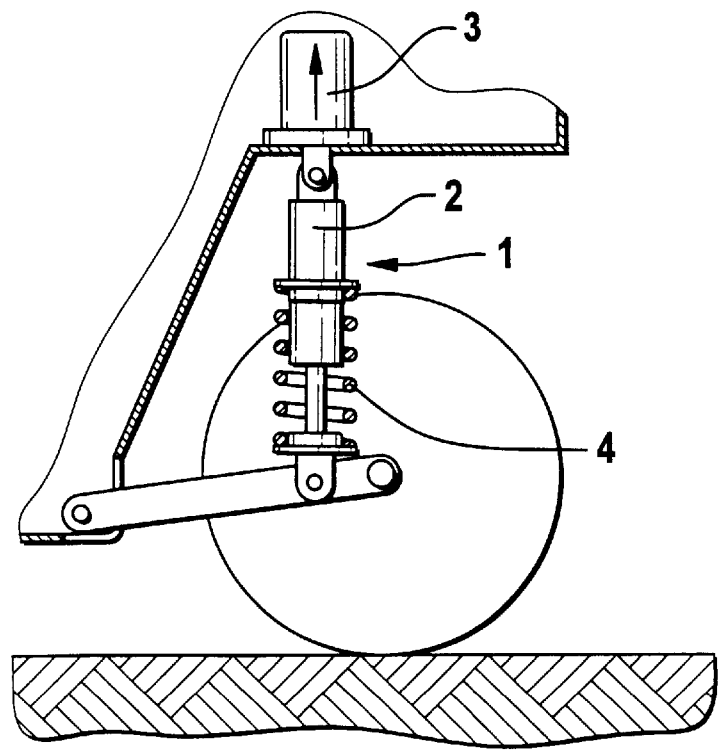
FIG. 4 shows the present invention mounted in a vehicle in a fourth position.

FIG. 4 shows the leveling device in the case of high speed travel i.e., freeway. The vehicle body is lowered by means of the actuator 3 in this case, which is advantageous for the aerodynamics.

Figure 5:
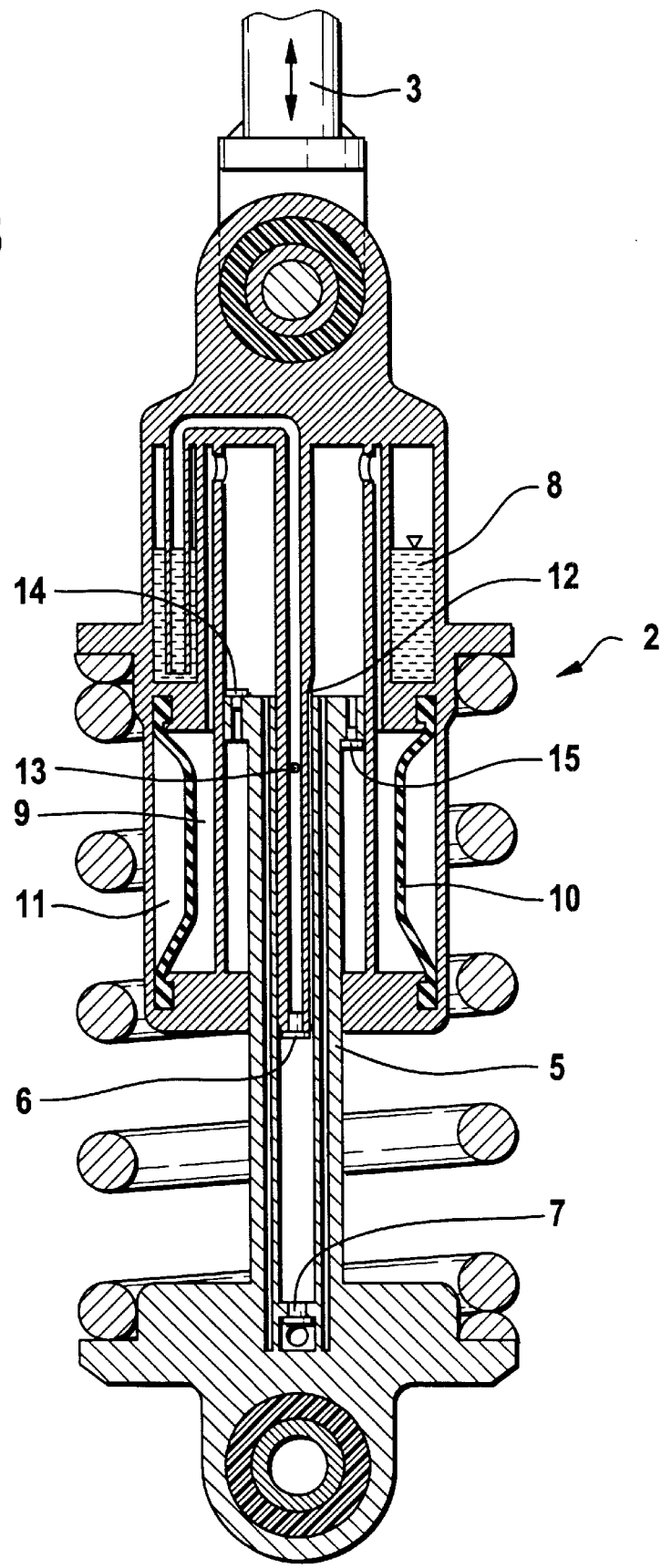
FIG. 5 is a sectional view of an embodiment of the present invention with the spring strut and actuator constructed as separate components.
Figure 6:
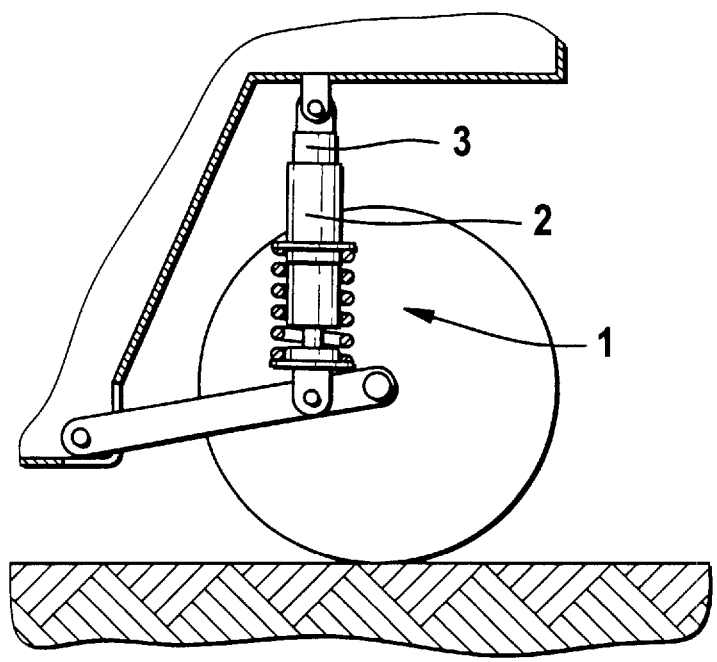
FIG. 6 shows an embodiment of the present invention with a spring strut and an integrated actuator arranged in the vehicle at a first position.
Figure 7:
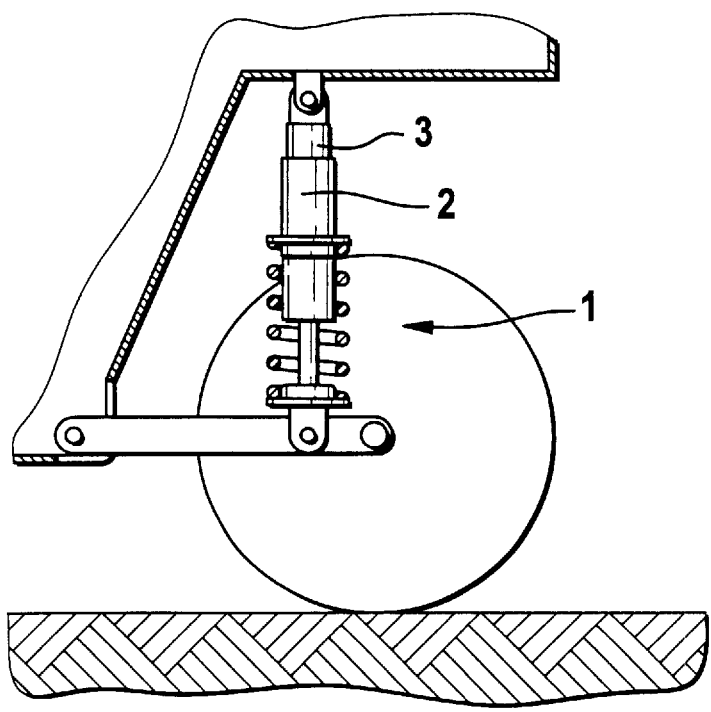
FIG. 7 shows an embodiment of the present invention with a spring strut and an integrated actuator arranged in the vehicle at a second position.
Figure 8:
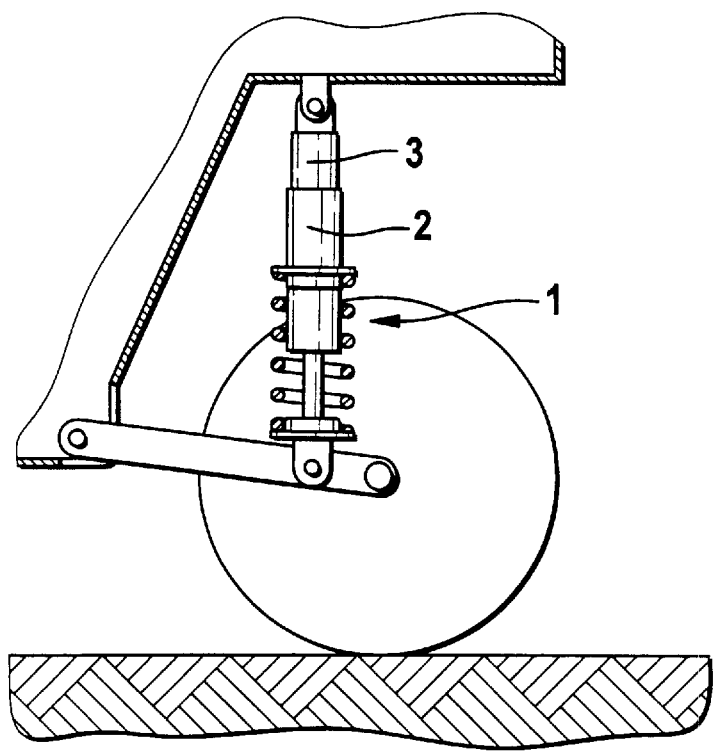
FIG. 8 shows an embodiment of the present invention with a spring strut and an integrated actuator arranged in the vehicle at a third position.
Figure 9:
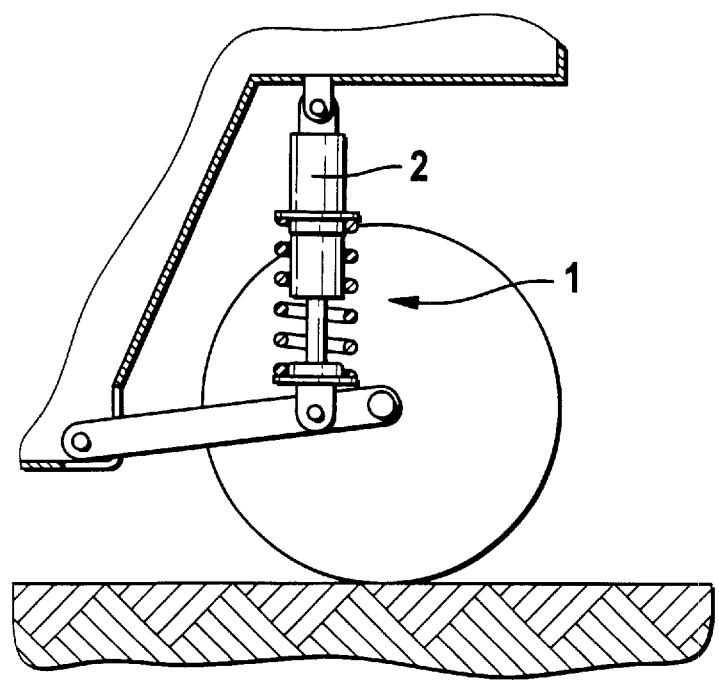
FIG. 9 shows an embodiment of the present invention with a spring strut and an integrated actuator arranged in the vehicle at a fourth position.

FIG. 5 shows a self-pumping hydropneumatic spring strut 2 with internal leveling in accordance with the prior art, the actuator 3 being provided on the upper fastening element. The actuator 3 is arranged in an articulated manner relative to the spring strut 2. An internal piston pump with an inlet and an outlet valve 6, 7 is actuated by inward and outward deflection of the piston rod 5 due to the roadway, pumping oil out of the low pressure space 8 into the high-pressure space 9, with the result that the gas 11 enclosed behind a diaphragm 10 is pressurized, and the piston rod 5 is pushed out. The bypass 12 gradually negates the pumping effect and the vehicle body settles at a particular level. When the vehicle is unloaded, the piston rod is briefly pushed further out, with the result that the outlet hole 13 enters into communication with the working space of the working cylinder and ensures that the vehicle body is lowered. The piston connected to the piston rod 5 is fitted with rebound and compression damping valves 14, 15 for the purpose of producing damping forces.

FIGS. 6 to 9 show a leveling device 1 which is comparable in principle to that in FIGS. 1 to 4, except for the fact that the actuator 3 is part of the spring strut 2. In these embodiments, the actuator 3 is integrated into the casing of the spring strut 2, the spring strut 2 and the actuator 3 thus being a single component.

Figure 10:
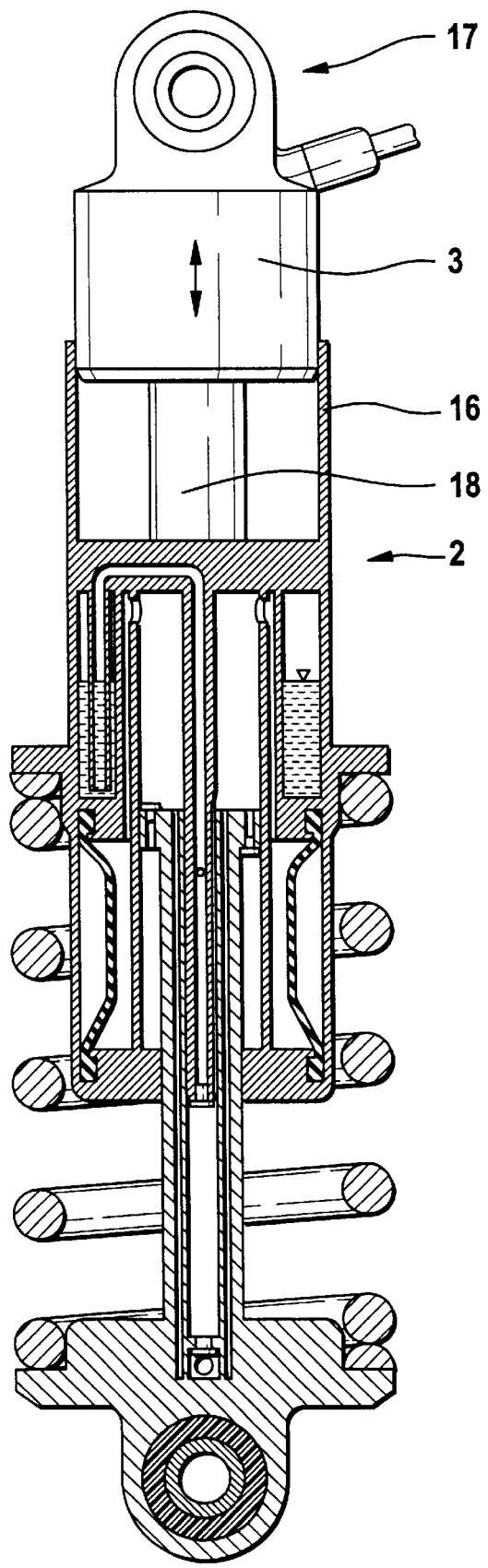
FIG. 10 is a partially sectioned detail view of a spring strut with internal leveling with an integrated actuator as a detail.

FIG. 10 illustrates a detail of a self pumping hydropneumatic spring strut 2 according to the present invention which is comparable in principle to that illustrated in FIG. 5. The actuator 3 is integrated into the spring strut 2 at the top of the casing 16 and the fastening part 17 is arranged in such a way that it can move axially relative to the casing 16 of the spring strut 2. In this case, the actuator 3 can be driven electrically, hydraulically or pneumatically relative to the guide 18 by means of a spindle, worm gear or the like.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A self-pumping hydropneumatic spring strut with internal leveling for a motor vehicle, comprising:
    a working cylinder;
    a working piston arranged in the working cylinder defining a high pressure chamber and a low pressure chamber, the piston and the working cylinder defining at least one gas cushion which acts as a spring, the high pressure chamber being connected to a working space, wherein a bleed opening forms a flow connection between the working space of the high pressure chamber and the low pressure chamber and can be closed as a function of the position of the piston in the working cylinder;
    a hollow piston rod moveably arranged in the working cylinder and connected to the piston and forming a piston pump which is driven by suspension movements, whereby oil is pumped out of the low pressure chamber into the working space connected to the high pressure chamber; and
    an actuator operatively arranged to vertically displace the spring strut, the actuator being operative for displacing the spring strut to a plurality of displacement distances independent of axial movement of the spring strut due to vehicle loading.

2. The spring strut according to claim 1, wherein the actuator is mounted between the spring strut and a body of the motor vehicle.

3. The spring strut according to claim 1, wherein the actuator and the spring strut form a single integrated unit.

4. The spring strut according to claim 1, wherein the actuator is one of electrically, hydraulically, and pneumatically driveable.

5. The spring strut according to claim 1, wherein the actuator comprises a self locking means for locking the actuator.

6. The spring strut according to claim 1, wherein the actuator is one of a spindle drive and a worm gear.

* * * * *